Patented Dec. 15, 1925.

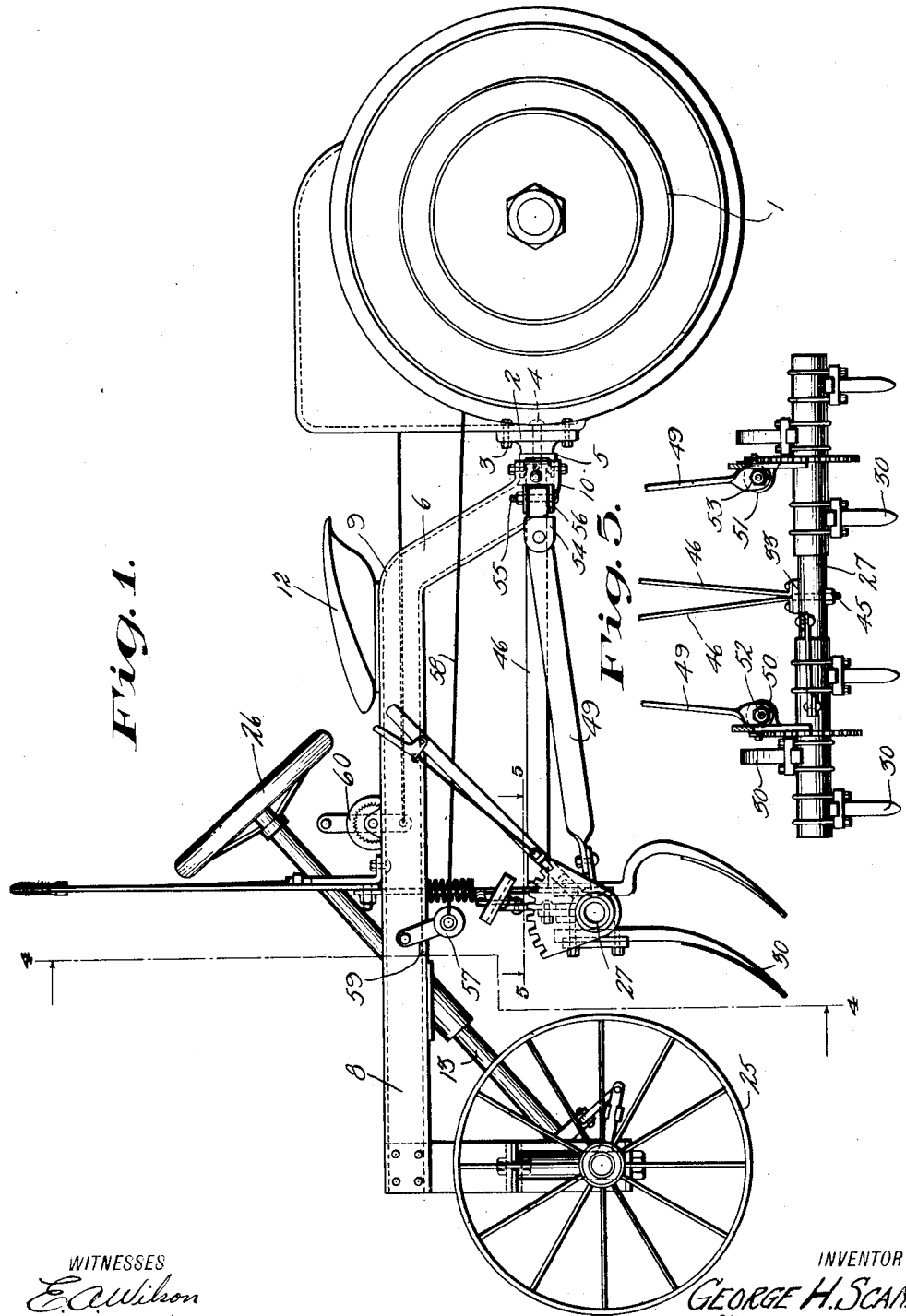

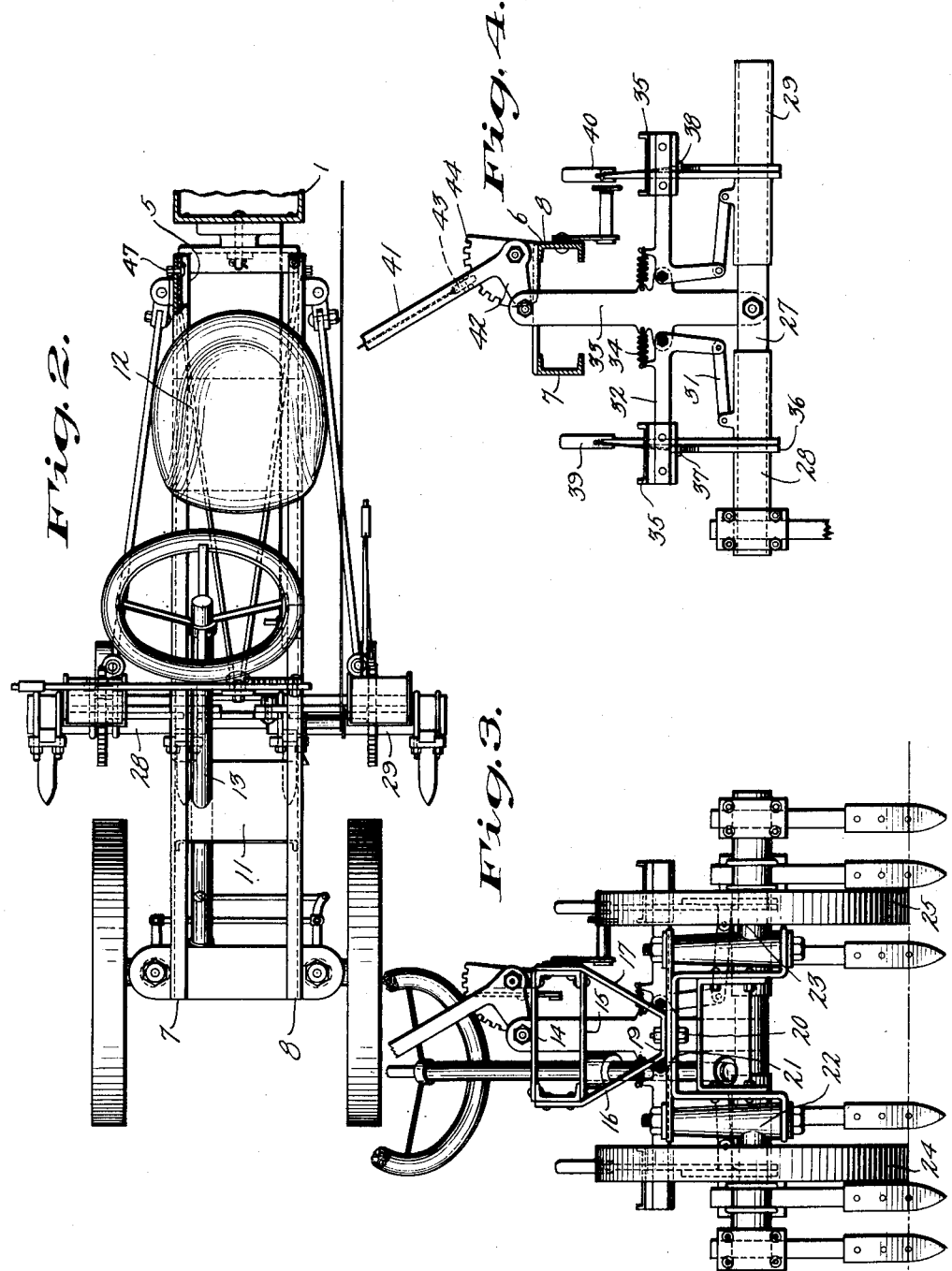

1,566,229

UNITED STATES PATENT OFFICE.

GEORGE H. SCANLAN, OF NEW YORK, N. Y.; MARY G. SCANLAN ADMINISTRATRIX OF SAID GEORGE H. SCANLAN, DECEASED.

TRACTOR-OPERATED CULTIVATOR.

Application filed February 27, 1920. Serial No. 361,815.

*To all whom it may concern:*

Be it known that I, GEORGE H. SCANLAN, a citizen of the United States, and a resident of the city of New York, borough of Manhattan, in the county and State of New York, have invented new and useful Tractor-Operated Cultivators, of which the following is a full, clear, and exact description.

This invention relates to a combined cultivator and tractor and has for an object to provide an improved construction wherein the tractor is arranged back of the cultivator and pushes the same.

Another object of the invention is to provide a construction wherein the tractor is connected to the rear of the cultivator in such a manner that the cultivator may be pushed along and yet allowed free lateral movement and the tractor also allowed free lateral movement so that the two structures may independently adjust themselves to the ground while the cultivator and tractor both act in their respective capacities.

A further object of the invention is to provide a cultivator propelled from the rear and arranged with means for steering and for manipulating the plow as well as controlling the engine from a central position where the operator may readily see the crop being cultivated and thereby adjust the parts so as to properly cultivate the soil without injuring any plant.

In the accompanying drawings:

Figure 1 is a side view of a combined tractor and cultivator disclosing an embodiment of the invention.

Figure 2 is a top plan view of the cultivator shown in Figure 1, the same also illustrating the connection with a tractor.

Figure 3 is a front view of the tractor shown in Figure 2.

Figure 4 is a fragmentary sectional view through Figure 1 on line 4—4.

Figure 5 is a detail fragmentary sectional view through Figure 1 on line 5—5.

Referring to the accompanying drawings by numerals 1 indicates a tractor of any desired kind as for instance, the two wheel tractor engine shown in my Patent No. 1,370,844, to which a bracket 2 is secured by any desired means, as for instance bolts 3. This bracket carries a horizontally positioned pin 4, which may be rotatably mounted therein or formed integral therewith, said pin extending through the end plate 5 of the cultivator frame 6, whereby the frame is connected with the tractor so that it may be pushed or pulled thereby while both the tractor and the cultivator are allowed independent lateral swaying movement to conform to the irregularities of the ground.

The cultivator frame 6 is formed from side bars 7 and 8, which may be channel bars if desired, said bars being bent at 9 and again at 10 so as to be properly bolted or otherwise connected to the cross bar 5. The bars 7 and 8 are secured together in any desired number of places by transverse plates 11, which may be used to support the seat 12 and guiding means for the steering column 13, or for other purposes. These side plates 7 and 8 are connected at the front by suitable transverse plates 14 and 15, and are also connected to depending plates 16 and 17 merging into a central horizontal section 18 carrying what may be termed a king bolt 19, which also passes through the horizontal section 20 of plate 21 carrying the stub shafts 22 and 23, which in turn carry the wheels 24 and 25. The stub shafts 22 and 23 are connected up in any suitable manner with the steering post 13, which post carries a steering wheel 26 whereby the wheels 24 and 25 may be turned for steering not only the cultivator but the tractor. This simplified form of steering means has been illustrated, but it will be understood that other forms of steering means may be used without departing from the spirit of the invention, the only necessary feature being the controlling wheel 26, or other controlling means shall be near the seat 12 so that the operator may steer the cultivator and also be in a position to operate certain parts of the cultivator and certain parts of the tractor for stopping the same and for throwing in and out the clutch as desired.

Arranged at a convenient point back of the wheels 24 and 25 is a transverse implement carrying bar 27, which may be solid or hollow as preferred, and is preferably formed round. On this bar are slidably mounted sleeves 28 and 29, said sleeves having the various implements 30 bolted thereto in any desired manner, as for instance by U-bolts. These implements are shown as ordinary cultivator shovels, but they may be any desired form of implement according to the way the ground is to be treated. A link 31 is pivotally connected to each of the sleeves 28 and 29, said link being in turn pivotally connected to one end of a bell crank lever 32, which is pivotally mounted on an upright 33 and resiliently held in a given position by a spring 34, which preferably is arranged as a retractile spring. A foot pedal 35 is mounted on the free end of the lever 32 so that whenever desired by pressing down on the lever 32 the sleeve 28 or 29, as the case may be, is forced inwardly or toward the center of bar 27. When the cultivator is in use and a plant is out of line it may be desirable to shift slightly one of the sleeves 28 or 29, in which instance the respective pedal 35 is depressed to the desired extent for shifting the implements to one side after which they are released and the respective springs 34 move the parts back to their original position. A rack 36 is rigidly secured to each of the sleeves 28 and 29, said racks co-acting with spring pressed catches 37 and 38 respectively, which are carried by the levers 39 and 40 whereby the levers are held in any adjusted position, and as they are rigidly secured to the respective sleeves 28 and 29 said sleeves will also be held in any adjusted position. In case it should be desirable to swing any of the implements out of operative engagement with the earth these levers are pushed forward which will swing the implements rearwardly. In case it should be desirable to bodily lift the implements out of the earth the bar 27 and associate parts together with the standard 33 are raised by the actuation of the lever 41, which lever has an extension 42 pivotally connected with the standard 33 as shown in Figure 4. A catch 43 is mounted on lever 41 and co-acts with the rack 44 which is rigidly secured to the frame 6 whereby the standard 33 may be locked in any desired adjusted position so as to permanently vary the depth at which the implements 30 may operate.

In order that the bar 27 may be properly braced and held in position at all times while allowing an up and down movement, the standard 33 is bolted to the bar 27 by a suitable bolt 45 (Figure 5). In addition bracing bars 46 and 47 are bolted or otherwise secured to the standard 33 near its lower end and then bolted or otherwise secured to the rear of the frame 6, bolts being shown as one method of holding them in place (Figure 2). Side bracing bars 48 and 49 are also provided, said bracing bars being pivotally connected with ears 50 and 51 extending from the lower end of levers 39 and 40, said connection being by suitable bolts 52 and 53. At the rear end each of the bracing bars 48 and 49 is pivotally connected to a fitting 54 so as to swing in a vertical plane, while said fitting is pivotally held in place by a bolt 55 so as to swing in a horizontal plane, said bolt 55 passing through suitable ears 56 connected with the frame 6.

In operating the device the operator sits on the seat 12 and operates the steering wheel 26 for following the rows of plants and occasionally pressing on the pedals 35 for shifting the implements 30. When the operator desires to stop the cultivator, and also the movement of the tractor without stopping the engine he operates the foot lever 57 which will pull upon the cable 58 and pull the clutch out. This lever is pushed forwardly until it snaps over the stop 59 where it remains until manually removed. If desired a control 60 may be used for controlling the spark of the engine of the tractor.

What I claim is:

1. A cultivator adapted to be fastened to a tractor in advance of the same, comprising a frame, a transverse bar, a sleeve mounted on said bar, means for clamping implements to said sleeve, a foot operated member for shifting said sleeve longitudinally of the bar, said bar extending transversely of the frame and the line of movement of the cultivator, and a spring for automatically returning said sleeve when released, whereby the cultivator is pushed by said tractor.

2. A cultivator adapted to be fastened to a tractor in advance of the same, comprising a frame, a transversely positioned bar carried by the frame, a pair of sleeves slidingly mounted on said bar, an independent foot operated member for shifting each of said sleeves longitudinally of the bar, means for clamping implements to each of said sleeves, and means for automatically returning said sleeves and implements, whereby the cultivator is pushed by said tractor.

3. A cultivator adapted to be fastened to a tractor in advance of the same, comprising a frame, a transversely positioned bar arranged below the frame substantially midway of the length thereof, a plurality of bracing means connected with the bar and with one end of the frame for bracing the bar, means for raising and lowering said bar, a plurality of sets of implements mounted on said bar and capable of movement longitudinally of the bar, and manually operated means for moving each of said sets longitudinally of the bar.

4. A cultivator adapted to be fastened to a tractor in advance of the same, comprising a frame, a transversely positioned implement carrying bar arranged below the top of the frame and between the ends thereof, means for connecting said bar with the frame so as to be supported by the frame, a pair of sleeves slidingly mounted on said bar, a pair of bell crank levers pivotally connected with the means for connecting the bar with the frame, a link connecting one end of each of the bell crank levers to the respective sleeves, a spring acting on each of the bell crank levers for holding the same in a given position, a manually operated pedal connected with each of the bell crank levers, said pedals being adapted to be operated by the foot of the operator of the cultivator so as to move the sleeves in one direction, said springs moving the sleeves in the opposite direction, and means for clamping a tool to each of said sleeves.

5. A cultivator adapted to be fastened to a tractor in advance of the same, comprising a frame, an implement receiving bar extending transversely beneath the frame, means for raising and lowering said bar, implements clamped to said bar, means for bracing the bar against the frame without interfering with the raising and lowering thereof, and means for rocking said implements, whereby the cultivator is pushed by said tractor.

GEORGE H. SCANLAN.